US012423094B2

(12) United States Patent
Bouat et al.

(10) Patent No.: US 12,423,094 B2
(45) Date of Patent: Sep. 23, 2025

(54) SOFTWARE LIFE-CYCLE COMPONENT MANAGEMENT SYSTEM

(71) Applicant: Hewlett Packard Enterprise Development LP, Spring, TX (US)

(72) Inventors: Sebastien Bouat, St Martin d'Uriage (FR); Nicolas Guerroudj, Grenoble (FR); Christophe Girardin, Alpes-Maritimes (FR); Dominique Domet De Mont, Grenoble (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 133 days.

(21) Appl. No.: 18/329,618

(22) Filed: Jun. 6, 2023

(65) Prior Publication Data

US 2024/0338209 A1 Oct. 10, 2024

(30) Foreign Application Priority Data

Apr. 5, 2023 (EP) .................................... 23305498

(51) Int. Cl.
*G06F 9/445* (2018.01)
*G06F 8/30* (2018.01)
(Continued)

(52) U.S. Cl.
CPC . *G06F 8/71* (2013.01); *G06F 8/60* (2013.01)

(58) Field of Classification Search
CPC ..... G06F 8/71; G06F 8/60; G06F 8/30; G06F 11/3668; G06F 9/3836; G06F 8/70;
(Continued)

(56) References Cited

U.S. PATENT DOCUMENTS 9,336,060 B2 5/2016 Nori et al.
11,711,315 B1 * 7/2023 Fernandes ............. H04L 47/781
709/226

(Continued)

FOREIGN PATENT DOCUMENTS

CN 107256178 A 10/2017

OTHER PUBLICATIONS

"Java Operator SDK—Documentation #", available online at <https://web.archive.org/web/20220702021100/https://javaoperatorsdk.io/docs/getting-started>, Jul. 2, 2022, 2 pages.

(Continued)

*Primary Examiner* — Thuy Dao
(74) *Attorney, Agent, or Firm* — Hewlett Packard Enterprise Patent Department

(57) ABSTRACT

A Life-cycle Component Management (LCM) system associated with Kubernetes can employ a universal operator to aid in the management of any software system, no matter the size or complexity. Specifically, the LCM system includes a universal operator, which eliminates the need for a human software developer to implement a set of workflows. The universal operator dynamically computes and runs the disclosed workflow set, based upon the description of the current state of the system (i.e., the "begin state") and the new desired state of the system (i.e., the "end state"). Thereby, this universal model enables LCM for large Kubernetes software systems, which require excessive workflow sets due to the intrinsic complexity of large software systems and the plurality of vendors that contribute to such systems.

17 Claims, 5 Drawing Sheets

(51) Int. Cl.
  *G06F 8/60* (2018.01)
  *G06F 8/71* (2018.01)
  *G06F 9/455* (2018.01)
  *H04L 47/80* (2022.01)
  *H04L 67/147* (2022.01)

(58) Field of Classification Search
  CPC ........ G06F 8/65; G06F 9/5083; G06F 9/5038;
       G06F 9/5072; G06Q 10/06; H04L
       67/561; H04L 67/63; H04L 67/10; H04L
       47/781; H04L 47/803; H04L 67/147;
       H04L 47/822
  See application file for complete search history.

(56) References Cited

U.S. PATENT DOCUMENTS

| | | | |
|---|---|---|---|
| 12,106,093 B2 * | 10/2024 | Gross | H04L 67/10 |
| 2002/0035463 A1 | 3/2002 | Lynch et al. | |
| 2019/0065323 A1 * | 2/2019 | Dhamdhere | G06F 11/1484 |
| 2019/0082004 A1 | 3/2019 | Bosch et al. | |
| 2020/0036790 A1 * | 1/2020 | Lv | G06F 3/0631 |
| 2022/0263826 A1 * | 8/2022 | Ping | H04L 41/5009 |

OTHER PUBLICATIONS

HPE, "HPE NFV Director", Data sheet, 2023, 8 pages.
Kubernetes, "Operator pattern", available online at <https://kubernetes.io/docs/concepts/extend-kubernetes/operator/>, Jan. 16, 2023, 3 pages.
NGMN Alliance, "Service-Based Architecture in 5G Case Study and Deployment Recommendations", 2019, 24 pages.
Wikipedia, "Infrastructure as code", available online at <https://en.wikipedia.org/wiki/Infrastructure_as_code>, Apr. 2023, 5 pages.

* cited by examiner

SOFTWARE LIFE-CYCLE COMPONENT MANAGEMENT SYSTEM

BACKGROUND

Life-Cycle Management (LCM) of a software workload includes managing the processes associated with an initial software deployment, software component reconfiguration, and software release upgrades. Kubernetes is an open-source container orchestration system developed for managing each of the multiple instances associated with each LCM process. Kubernetes provides automated software deployment, scaling, and management, supporting various ways of deploying and handling the LCM of a software workload. That is, this management environment handles the initial software deployment and various other operations that can be performed beyond deployment, such as reconfiguration of software components, software version upgrades, addition or removal of sub-systems or components, and the like. It provides a variety of native mechanisms, which can range from the implementation of "low-level" resources, such as deployment, service, and configuration mapping, to higher-level abstractions, such as Helm Charts or Operators. Kubernetes is also one of the state-of-art environments for operating cloud-native containerized software. That is, it allows an organization to operate its cloud-native infrastructure with a focused and standard set of skills. Thereby, the user can benefit from a rich and powerful ecosystem of functional features and tools that are accessible in native mechanisms.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
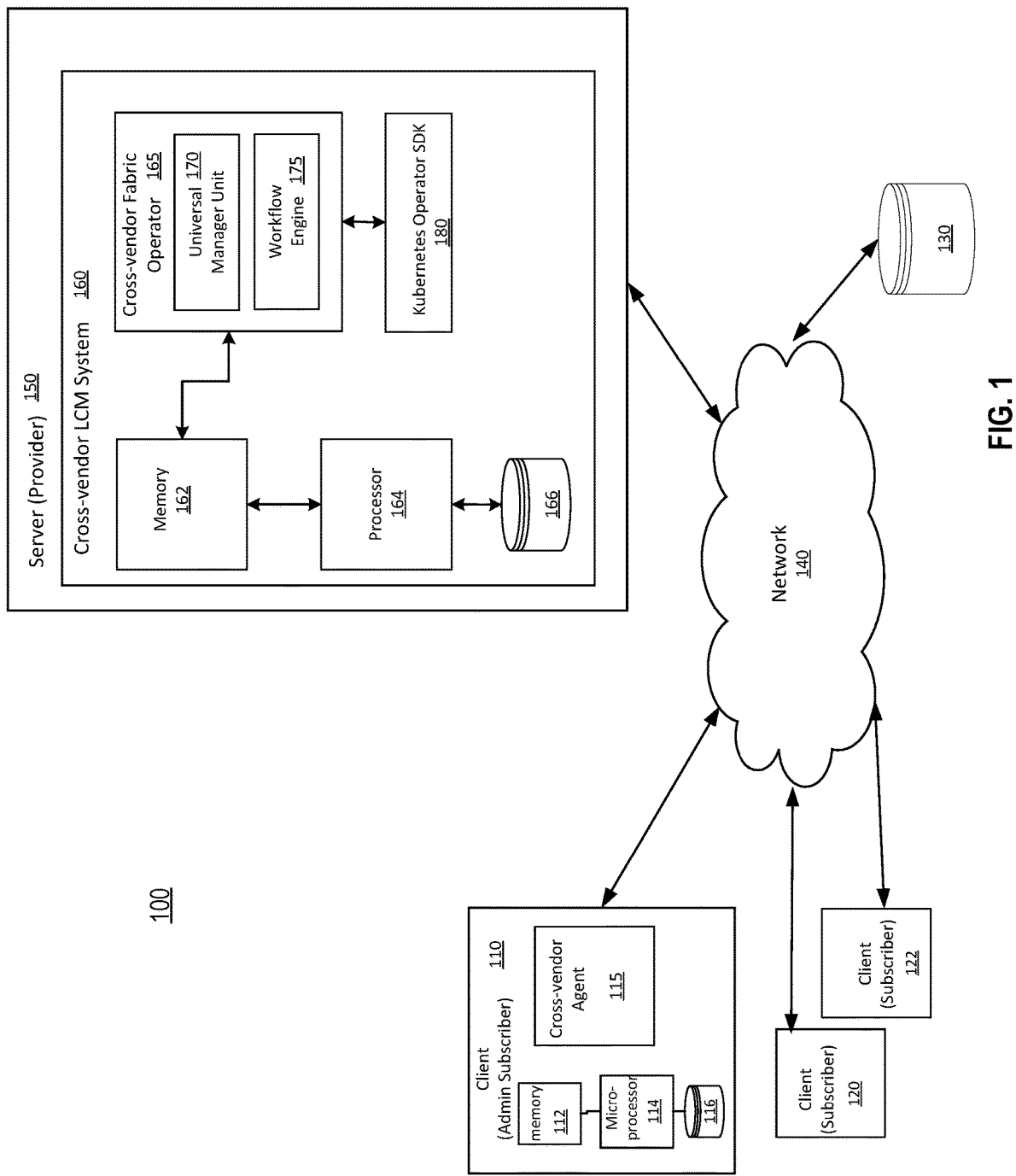
FIG. 1 illustrates a system diagram of a networked Life-Cycle Management (LCM) system having the cross-vendor fabric operator arrangement, in accordance with some examples.

While the examples are described with reference to the above drawings, the drawings are intended to be illustrative, and various other examples are consistent with the spirit, and within the scope, of this disclosure.

DETAILED DESCRIPTION

Life-Cycle Management (LCM) systems enable automation of the initial deployment and subsequent upgrades of a software system, e.g., a Software As A Service (SaaS) package. Helm charts, designed as "simple" packaging frameworks for LCM systems, are often well-suited for small to medium-size software systems. Alternatively, Kubernetes operators is another LCM technology that goes beyond the scope of Helm charts for implementing a control loop with the aim of mimicking reactions of a human operator. Yet, helm charts and Kubernetes operators are often not scalable for larger software systems that typically comprise a plurality of smaller sub-systems. Instead, an administrator/user often writes customized workflows using over-the-top CI/CD (Continuous Integration/Continuous Deployment) or orchestration technologies. Oftentimes, this is an extremely complex and time-consuming process. Besides implementing the appropriate workflow to achieve the initial deployment; the operator also implements a variety of other functions, including "modification" workflows. These steps grow exponentially in number and complexity with the size of the system due to the number of sub-systems and the coupling of the same. Further, a new set of workflows is developed for each new large system or significant variation of an existing large system.

The following examples describe a system, method, and device for implementing LCM of a software system, no matter the size or complexity. Particularly, the novel LCM system disclosed herein is directed towards a life-cycle component management for a software system, comprising a customized universal operator. Instead of requiring a human software developer to implement a set of workflows, this universal operator dynamically computes and runs the workflow set, based upon the description of the current state of the system (i.e., the "begin state") and a new desired state of the system (i.e., the "end state"). Thereby, this universal model enables LCM for large Kubernetes software systems, which often require an excessive amount of workflow sets due to the intrinsic complexity of large software systems and the plurality of vendors that typically contribute to the development of such systems.

In one example, the method of LCM data processing includes receiving a request to deploy software having one or more software components associated with one or more vendors from a client node in a deployment mode. In other examples, a request may be received to upgrade the current software, reconfigure the software, add components to the current software, or remove components from the current software. In each instance, the LCM system requests descriptors, including a function descriptor, a blend descriptor, a layout descriptor, and a settings descriptor, from the client node that provide the definition of the one or more software components aligning with the new version of code. These descriptors are implemented as Kubernetes Custom Resources (CRs) and are applied to a universal manager unit, which deploys the software components.

In one example, the method of deploying the software components using the universal manager unit includes detecting whether a new layout/settings pair has been received from (or designated by) the client node. In response to a detected new layout/settings pair, the universal manager unit detects whether the new layout/settings are correct based upon semantical verification, wherein the data held in layout and settings CRs are verified to be contextually correct beyond pure syntax. For example, the universal manager unit can verify whether an "items" field of the new layout holds a list of instantiated function and blend software components which are referenced by name. That is, the name field must reference a known function or blend found in a prior function descriptor and blend descriptor. In response to correct layout/settings, the universal manager unit determines a difference between a set of components and blends associated with a prior layout descriptor and a prior settings descriptor. The method further includes generating, based upon the determined difference, a set of Kubernetes operations to be performed for modifying the software to be deployed. The universal manager unit sends the set of Kubernetes operations to a workflow engine within the cross-vendor fabric operator to execute as a job request. Each job request is executed using the workflow engine. At the end of execution, the workflow engine detects whether the deployment is correct. Based upon whether the deployment is correct or not, the workflow engine sends either an error message or a confirmation message that the software has been deployed to the universal manager unit.

In some examples, the cross-vendor fabric operator uses software definition constructs deployed as Kubernetes native Custom Resources (CR), including a Function descriptor, a Blend descriptor, a Layout descriptor, and a Settings descriptor. The Function and Blend descriptors describe the building blocks of the software system. These are written once and are typically provided by the owner of each software component. The Function descriptor represents the smallest grain component of a software system. The Function descriptor is typically accompanied by one or several small-size helm charts or raw Kubernetes resources. The Blend descriptor aggregates multiple Function descriptors or other Blend descriptors recursively, into a new atomic component. The CRs are typically written in YAML. The Layout descriptor instantiates the Function and Blend descriptors 0, 1, or several times into the target software system. Hence, the underlying software components are instantiated as well. The Settings descriptor configures the software components instantiated in the Layout descriptor. The Layout and Settings pairs are written for each concrete software system. These enable the description of the begin state system and the end state system.

Advantageously, the universal model enables LCM for extremely large Kubernetes software systems, which require excessive workflow sets due to the large variety of vendors that contribute to larger software systems without the need for human assistance. Beyond deployment, the LCM system having the cross-vendor fabric operator described herein can also manage a complete lifecycle of a software release. For example, the cross-vendor fabric operator can handle operations like live patching, upgrade, or reconfiguration of a software release.

The method of LCM processing for the cross-vendor fabric operator is based on a begin-state/end-state pattern. The cross-vendor fabric operator computes the gap between a begin-state pattern and an end-state pattern, as a set of operations to be performed to go from the begin-state, represented by a first pair of layout and settings descriptors, to the end-state, represented by second pair of layout and settings descriptors. An empty-begin state represents the initial deployment of the software, whereas empty-end state represents the removal or un-deployment of the software.

Referring now to FIG. 1, a system diagram of a networked Life-Cycle Management (LCM) system having the cross-vendor fabric operator arrangement in accordance with some examples is illustrated. Networked LCM system 100 includes at least one client node (110, 120, 122), network 140, at least one service provider server 150, and remote data store 130. Although not shown, networked LCM system 100 may also include at least one dumb terminal, such as a land line, cell phone, pager monitor, and the like. Computing devices nodes (110, 120, 122), with local data store 116, are coupled by network 140 to server 150 comprising cross-vendor LCM system 160. There are at least two types of client nodes: administrator/subscriber client nodes (110) and user/subscriber client nodes (120, 122). Administrator/subscriber client node 110 is enabled to request the initial deployment of software, an associated upgrade, and various types of reconfigurations of the same. Each administrator/subscriber client node 110 may include a cross-vendor agent 115, a memory 112, a processor 114, and a local data store 116. Unlike administrator/subscriber client nodes (110), user/subscriber client nodes (120, 122) do not have privilege rights to deploy, upgrade, nor reconfigure software. Although one administrator/subscriber client node (110) is shown, there can be any number of administrator/subscriber client nodes (110).

In some examples, cross-vendor LCM system 160 may include memory 162, processor 164, local storage 166, and cross-vendor fabric operator 165. Cross-vendor fabric operator 165 may include universal manager unit 170 for dynamically generating an operator pursuant to a requested deployment, upgrade, or reconfiguration of software components (as described below with reference to FIGS. 2 and 3). Universal manager unit 170 detects the differences between the requested software modification and the existing software version and generates a set of Kubernetes instructions based upon these differences. Workflow engine 175 couples to universal manager unit 170 to receive and run a set of Kubernetes instructions generated by universal manager unit 170. Cross-vendor fabric operator 165 couples to native Kubernetes Operator Software Developers Kit (SDK) 180 and uses a software upgrade request trigger as a flag to run universal operator in some examples. Server 150 may couple to a remote storage device 130 to reference prior software versions and related parameters described below.

In operation, a user of one or more of the administrator/subscriber client nodes (110) may initiate a request to initially deploy software, an associated upgrade, or various types of reconfigurations of a version of software. For example, the cross-vendor LCM system 160 receives the request to deploy software having one or more software components associated with one or more vendors from a client node in a deploy mode. In other examples, the request may be received to upgrade the current software, reconfigure the software, add components to the current software, or remove components from the current software (explained in detail below). In each instance, cross-vendor LCM system 160 requests descriptors, including, but not limited to, a function descriptor, a blend descriptor, a layout descriptor, and a settings descriptor, from the administrator/subscriber client node 110. The descriptors provide the definition of the one or more software components aligning with the new version of code. The requested descriptors are CRs applied to universal manager unit 170, which deploys the software components. The universal manager unit 170 couples to receive a trigger flag from operator SDK 180 indicating that there has been a change in the software components aligning with a requested deployment, upgrade of the current software, reconfigure the current software, add new components to the current software, or to remove components from the current software version.

In some examples, universal manager unit 170 implements the method of deploying the software components, wherein it first detects whether a new layout/settings pair has been designated by client node 110 using the operator SDK flag and other data processing. In response to the detection of the existence of new layout/settings, universal manager unit 170 detects whether the layout/settings pair is correct based upon semantical verification, wherein the data held in layout and settings CRs are verified to be contextually correct beyond pure syntax. For example, the universal manager unit 170 can verify whether an "Items" field of the new layout holds a list of instantiated "Function" and "Blend" software components which are referenced by name. That is, the name field must reference a known function or blend found in a prior function descriptor and blend descriptor. In response to correct layout/settings pair, universal manager unit 170 determines a difference between a set of components and blends associated with a prior layout descriptor and a prior settings descriptor. Moreover, the universal manager unit 170 generates, based upon the determined difference, a set of Kubernetes operations to be performed for modifying the software to be deployed. Specifically, the universal manager unit 170 dynamically computes the path from the begin state to the end state to be completed as a set of Kubernetes operations. Particularly, the method of LCM processing for the cross-vendor fabric operator is based on a begin-state/end-state pattern, where the cross-vendor fabric operator computes the gap between both, as the set of operations to be performed to go from a begin-state represented with a first pair of layout and settings descriptors, to an end-state represented with second pair of such descriptors. Specifically, an empty-begin state represents the initial deployment of the software, whereas empty-end state represents the removal or un-deployment of the software. Further, the universal manager unit 170 sends the set of Kubernetes operations to a workflow engine 175 within the cross-vendor fabric operator 165 to execute as a job request. The workflow engine 175 executes each job request. At the end of execution, the workflow engine 175 detects whether the deployment is correct. Based upon whether the deployment is correct or not, workflow engine 175 sends to universal manager unit 170 either an error message (when the deployment is not correct) or a confirmation message that the software has been deployed. The universal manager unit 170 then reports this result to client node 110.

This universal model 160 enables LCM for extremely large Kubernetes software systems, which require excessive workflow sets due to the large number of components and the large variety of vendors that contribute to larger software systems without the need for human assistance. Beyond deployment, LCM system 160, having cross-vendor fabric operator 165 described herein, also manages the complete life cycle of any software release. For example, cross-vendor fabric operator 165 may live-patch, upgrade, or reconfigure a software system, e.g., in response to a new software version or release as described in a new layout descriptor.

It is appreciated that the components of operating environment of system 100 are examples; wherein more or fewer components may be present in various configurations. It is appreciated that operating environment may be part of a distributed computing environment, a cloud computing environment, a client server environment, and the like.

As would be apparent to one of ordinary skill in the art after reading this description, the various features and functionality described herein may be implemented in the LCM architecture using any arrangement components pertinent to the performance of the cross-vendor fabric operator features (and functionality); and can be implemented in one or more separate or shared modules in various combinations and permutations.

Figure 2:
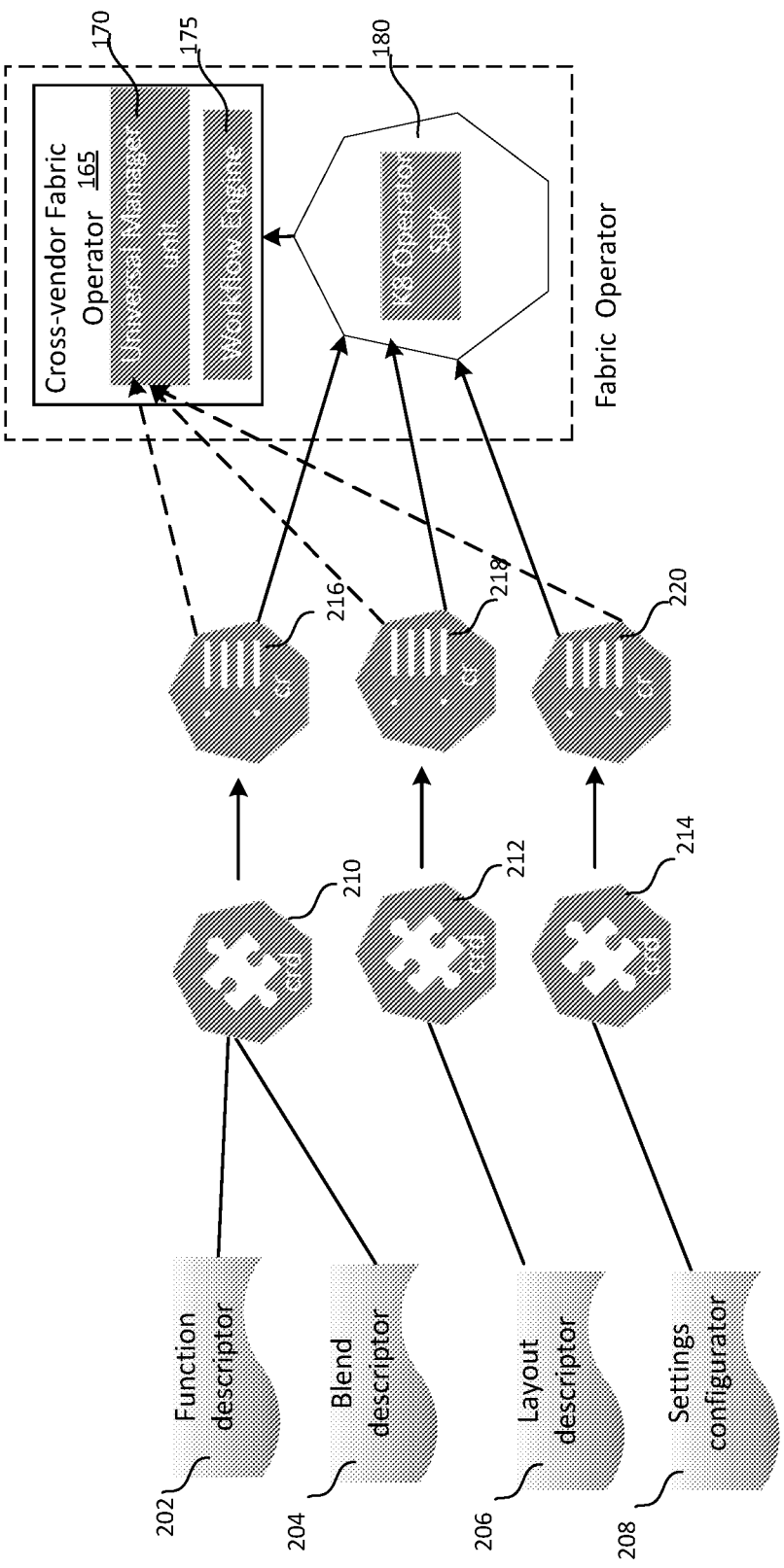
FIG. 2 shows a block diagram of the descriptor dataflow associated with the Custom Resource Descriptor (CRD) and Custom Resource (CR) files within the LCM system of FIG. 1 as in some examples.

Referring now to FIG. 2, a block diagram of the descriptor dataflow associated with the Custom Resource Descriptor (CRD) and Custom Resource (CR) files within the LCM system of FIG. 1 as in some examples is shown. Cross-vendor fabric operator 165 uses software definition constructs deployed as Kubernetes native Custom Resources (CR) (216, 218, 220), including function descriptor 202, blend descriptor 204, layout descriptor 206, and settings descriptor 208. In particular, the function and blend descriptors (202, 204) describe the building blocks of the requested (target) software system. These are written once and are typically provided by the owner of each software component. Function descriptor 202 represents the most granular component of the requested software system. Function descriptor 202 is typically accompanied by a small-size helm chart or operator. Blend descriptor 204 aggregates multiple function descriptors 202 or other blend descriptors 204 recursively, into a new atomic component. CRs (216, 218, 220) are typically written in YAML. Layout descriptor 206 instantiates function and blend descriptors (202, 204) one or more times into the target software system. Hence, the underlying software components are instantiated as well. Settings descriptor 208 configures the software components instantiated in layout descriptor 206. The layout and settings (206, 208) pairs are written for each concrete software system. These enable the description of the begin state system and the end state system.

The cross-vendor fabric operator 165 is divided into two main functions: a controller part (170) that computes the flow of Kubernetes operations to be executed to perform the requested operation, and an engine part (175) that runs this workflow. The controller part (the universal manager unit 170) implements diff logic, allowing it to identify the gap between begin and end states. Consequently, the universal manager unit 170 can, based upon a graph traversal algorithm, determine the process for transitioning from begin state to end-state. This workflow, as a sequence of bulk operations (including parallel operations), is then executed by the workflow engine 175. The workflow engine 175 also manages the interface with the Kubernetes cluster. including abstracting or devising the way requested resources are packaged (e.g., as native objects, helm charts, or operators) and checking whether they are successfully created.

In some examples, the operator-based fabric uses an open-source Kubernetes operator SDK. In general, Kubernetes operators require that the structure of the descriptors is formalized into Custom Resource Descriptors (CRDs). The actual descriptors sent by the user are CRD instances called Custom Resources (CRs). These CRs are typically written in YAML. The compliance of CRs with matching CRD structures is checked automatically by Kubernetes. With Kubernetes, the operator SDK automatically detects when any one of the CRs is modified, added, or removed. The cross-vendor solution (universal manager unit 170) uses this feature of the operator SDK to know when the end-state has changed. Based on this change, fabric operator 165 is triggered. The rest of the processing aligns with the regular pattern for fabric processing. Accordingly, LCM system 160 as disclosed herein can deploy and operate a relevant software system using cross-vendor fabric operator 165.

Figure 3:
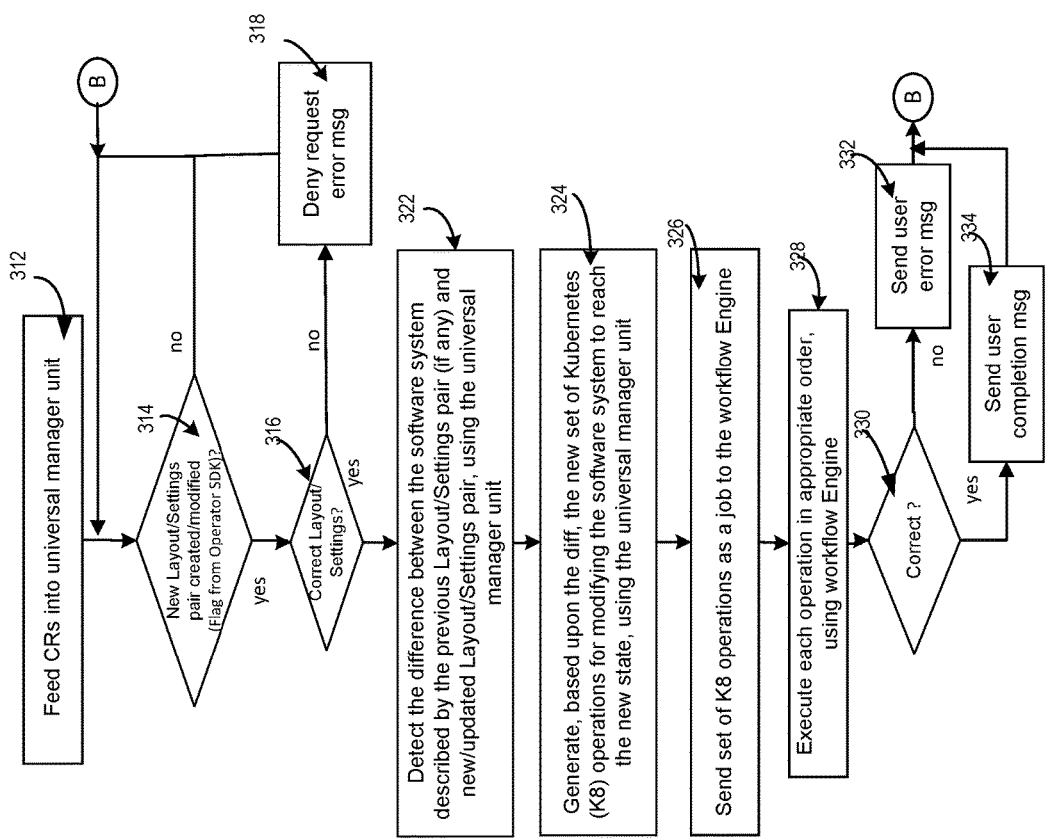
FIG. 3 displays a flow diagram of a method of the cross-vendor fabric operator of FIG. 1 for data processing of LCM in accordance with some examples.

Referring now to FIG. 3, a flow diagram of a method 300 of the cross-vendor fabric operator of FIG. 1 for data processing of LCM in accordance with some examples is shown. Prior to the method of LCM data processing, a user initiates an LCM change such as a request to deploy, reconfigure, or upgrade software. For example, an administrator/user at client node 110 can request a target software version having one or more software components associated with one or more vendors from a client node to be deployed in a deployment mode. In other examples, a request may be received to upgrade the current software, reconfigure the software, add components to the current software, or remove components from the current software. In each instance, the user pushes the descriptors from the client node. For example, LCM system 160 may receive from the user at client node 110 descriptors associated with the target software version, including a function descriptor, a blend descriptor, a layout descriptor, and a settings descriptor. These descriptors provide the definition of the one or more software components aligning with the new version of code. These CRs comply with the aforementioned CRD format. In an action 312, which begins the method of LCM data processing 300 described herein, these CRs are applied to a universal manager unit, e.g., universal manager unit 170, in preparation for generating a dynamic workflow for deploying the software components.

In some examples, the LCM method 300 includes applying a software orchestration process to the descriptors using the universal manager unit in cooperation with a workflow engine within the fabric operator. For example, method 300 of deploying the software components using the universal manager unit includes detecting in a decision action 314 whether a new layout/settings has been requested by the client node. When the existence of a new layout/settings pair is not detected, the method loops back to the decision action 314 waiting for a new layout/settings pair to be input by the user at the client node. In a second decision action 316, method 300 includes detecting whether the layout/settings are correct, in response to detecting the existence of a new layout/settings pair created/modified using the operator SDK. For example, in response to the new layout/settings pair existence, universal manager unit 170 detects whether the new layout/settings pair is correct based upon semantical verification, wherein the data held in layout and settings CRs are verified to be contextually correct beyond pure syntax. For example, the universal manager unit 170 can verify whether an "Items" field of the new layout holds a list of instantiated "Function" and "Blend" software components which are referenced by name. That is, the name field must reference a known function or blend found in a prior function descriptor and blend descriptor. In response to an incorrect layout/settings, the user is sent an error message, in an action 318. In response to a correct layout/settings, method for dynamically provisioning software derived by a plurality of vendors includes determining a difference between a set of components and blends associated with a prior layout descriptor and a prior settings descriptor in an action 322. For example, universal manager unit 170 determines a difference between a set of components and blends associated with a prior layout descriptor and a prior settings descriptor. Specifically in one example, universal manager unit 170 retrieves a prior layout descriptor and a prior settings descriptor using the universal operations unit. Further, universal manager unit 170 builds a first in-memory object representation of a first version of software system currently deployed using content of the prior layout descriptor and the prior settings descriptor. Universal manager unit 170 also builds a second in-memory representation of a second version of the software system expected to be deployed using content of a current layout descriptor and a current settings descriptor. Defining the difference, universal manager unit 170 performs an object-based comparison between the first in-memory object representation and the second in-memory representation. Based on the object-based comparison, universal manager unit 170 identifies at least one layout or settings descriptor change associated with the next deployed version of the software.

In some examples, method 300 further includes generating, based upon the determined difference, a set of Kubernetes operations to be performed for modifying the software to be deployed, in an action 324. In particular, method 300 of LCM processing for the cross-vendor fabric operator is based on a begin-state/end-state pattern, where the cross-vendor fabric operator computes the gap between both, as the set of operations to be performed to go from a begin-state represented with a first pair of layout and settings descriptors, to an end-state represented with second pair of such descriptors. Specifically, an empty-begin state represents the initial deployment of the software, whereas empty-end state represents the removal or un-deployment of the software. In an action 326, the universal manager unit 170, for example, generates and sends the set of Kubernetes operations to a workflow engine within the cross-vendor fabric operator. In an action 328, the method includes executing each job request using workflow engine. For example, the workflow engine executes a set of Kubernetes operations to be performed for modifying the software to be deployed as a job request. Moreover, the method includes a verification step to check to see if the software has been deployed properly in an action 330. For example, after the workflow engine executes the Kubernetes operations, workflow engine 175 detects whether the deployment is correct and reports to the universal manager unit 170 (FIG. 2). Based upon whether the deployment is correct or not, workflow engine 175 sends either an error message (in an action 332) or a confirmation message to universal manager unit 170 that the software has been deployed (in an action 334). Universal manager unit 170 relays this status to the user at client node 110.

In some examples, the method of LCM processing may begin with receiving a request by a client node 110 to deploy software and requesting the user provide descriptors, including a function descriptor, a blend descriptor, a layout descriptor, and a settings descriptor. In other examples the method of LCM processing may begin with the detection of a difference between the software system described by the previous layout/settings pair and a new requested (target) layout/settings pair of action 322, or processing actions 322-334. In these examples, the LCM processing method assumes that there is a change associated with a requested deployment, reconfiguration or upgrade begin state and end state. In cases where there is no actual change or difference between the requested layout/settings and the prior layout/settings pair, no set of Kubernetes operations will be derived for the workflow engine to execute; and the user will receive an error message (in action 322).

Beneficially, the LCM system having the cross-vendor fabric operator method disclosed herein manages the complete life cycle of any software release. For example, the cross-vendor fabric operator can handle operations like live patching, upgrade, or reconfiguration of a software release.

Figure 4:
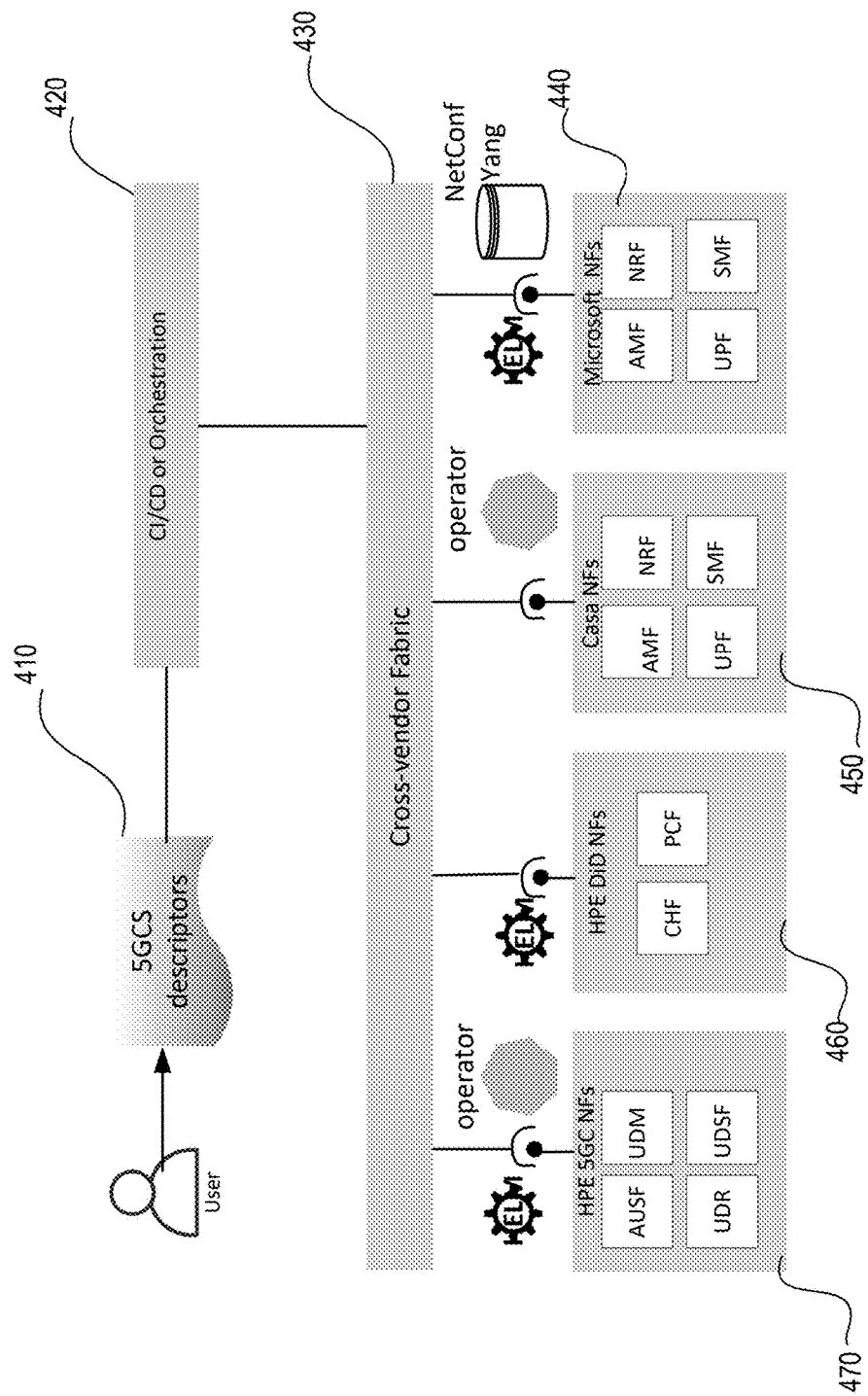
FIG. 4 illustrates a block diagram of one implementation of the LCM system for 5GCS, in accordance with some examples.

Referring to FIG. 4 illustrates a block diagram of one implementation 400 of the LCM system for 5GCS, in accordance with some examples is provided. This latest telecom standard is a good example of a software package that can benefit from the LCM system having a cross-vendor fabric operator. In particular, even though the Telecom industry has embraced virtualization for deploying highly centralized core network software-based equipment, the latest 5G standard comes with specific requirements that challenge virtualization. First, 5G Service Base Architecture (SBA) promotes breakdown of the core network into a large number of small micro-services (called "Network Functions"—NFs) that do not accommodate well using Virtual Machines. Second, 5G replaces one-size-fits-all single network; yet it focuses on the concept of specialized network instances dedicated to a certain type of traffic, such as video streaming, IOT, and the like; and a certain type of customer, whether production factory, large account, and the like. These specialized network instances are called "slices."

During LCM of each 5G software release, managing potentially thousands of slices possibly running in various places including a customer's premises within a distributed architecture for enterprise businesses requires higher flexibility and dynamicity than ever. These types of networks are not static, centralized, or monolithic networks. This, together with the forecasted technology associated with containerization, pushes operator development toward the adoption of a cloud native infrastructure. A 5G slice typically holds NFs from multiple vendors (440-470) where each has selected its own deployment approach or several differing ones. This further adds to, and overlaps with, specific configuration technologies, such as Netconf/Yang or various types of databases. It also conflicts with centralized performance management, logging, and network tracing. Thus, managing the lifecycle in a predictable way of many such slices becomes an extremely complex problem.

Fortunately, the LCM system having cross-vendor fabric 430 described herein has the ability to seamlessly deploy a large number of various NFs and slices. In this example, the user supplies 5GCS descriptors 410, including the previous descriptors: component/function descriptors, blend descriptors, layout descriptors and settings descriptors. As noted supra, component/function descriptors match each elementary logical piece of software. These descriptors hold various information about the related component, such as its configuration parameters; relationship with other components; and/or the methods for configuring or deploying the same. Blend descriptors aggregate several components or other blends. Both blend and component descriptors are written once. These are also independent from the nature and the topology of the deployment. They can be delivered as part of the 5GCS product. The Layout descriptor instantiates existing component and blends. The Settings descriptor configures the component and blend instances defined in the layout. These two descriptors are specific to each customer and each deployment.

Following the LCM cross-vendor method described previously, user provided descriptors 410 are supplied to Continuous Integration/Continuous Delivery (CI/CD) or orchestration unit 420, which serves as input to innovative cross-vendor fabric 430 disclosed herein. Cross vendor fabric 430 supports the deployment, reconfiguration, and upgrading of any of the NFs (440-470) from multiple vendors as shown in this example implementation. Each network slice contains NFs that rely on some general-purpose resource provided by the Kubernetes, such as databases, message queues, centralized logging or network tracing, called Backing Services. Simple NFs and Backing Services are typically modeled in Component descriptors. More complex NFs are represented by Blend descriptors. For example, NFs responsible for storing Telecom subscribers' data and embedding a database or slices are represented by Blend descriptors. Any upper layer OSS Orchestration (such as, for example, the HPE NFV Director) or CI/CD can interface with innovative fabric logic 430, which translates this set of descriptors into an action-plan workflow to perform the desired deployment into the target Kubernetes cluster. As shown, the examples of NFs include an Authentication Server Function (AUSF), Unified Data Management (UDM), Unified Data Repository (UDR), Unstructured Data Storage Function (UDSF), Charging Function (CHF), Policy Control Function (PCF), Access and Mobility Management Function (AMF), Network Repository Function (NRF), User Plane Function (UPF) and Session Management Function (SMF). Beyond deployment, fabric 430 also manages the complete life cycle of any individual NF, for operations like live patching, upgrade or reconfiguration on production system. This is based on a begin state/end state pattern, where cross-vendor fabric operator 430 computes the gap between both, as the set of operations to be performed to go from a begin state represented with a first pair of layout and settings descriptors, to an end state represented with second pair of such descriptors. An empty begin state represents the initial deployment of the software, whereas empty end state represents the removal or un-deployment of the software. Other combinations define a change in the currently deployed network.

Advantageously, hiding life-cycle management complexity is major value-add of the cross-vendor fabric operator in the process of composing and implementing NFs, in an effort to manage slices in a simple manner. This openness may be used for some relatively static CI/CD use-cases; however, it can easily be leveraged for more advanced on-demand slicing use-cases in cooperation with some Orchestration tools. Although this system and method of LCM is most beneficial for larger software systems, such as, the 5G network, this innovative LCM system is independent from 5G domain. It can be applied universally to any software system. The model-driven approach (through descriptors) maps to the Kubernetes operator paradigm. The fabric descriptive approach decorrelates what is expected, i.e., matching the operator-desired state paradigm, from how the expected result is achieved. The begin state/end state pattern enables straight implementation of a control loop, which is the core of a Kubernetes operator. Exposing the fabric as a native Kubernetes operator resource facilitates its integration with any CI/CD chain or Orchestration framework, which is Kubernetes-enabled, while shielding it from underlying complexity.

Figure 5:
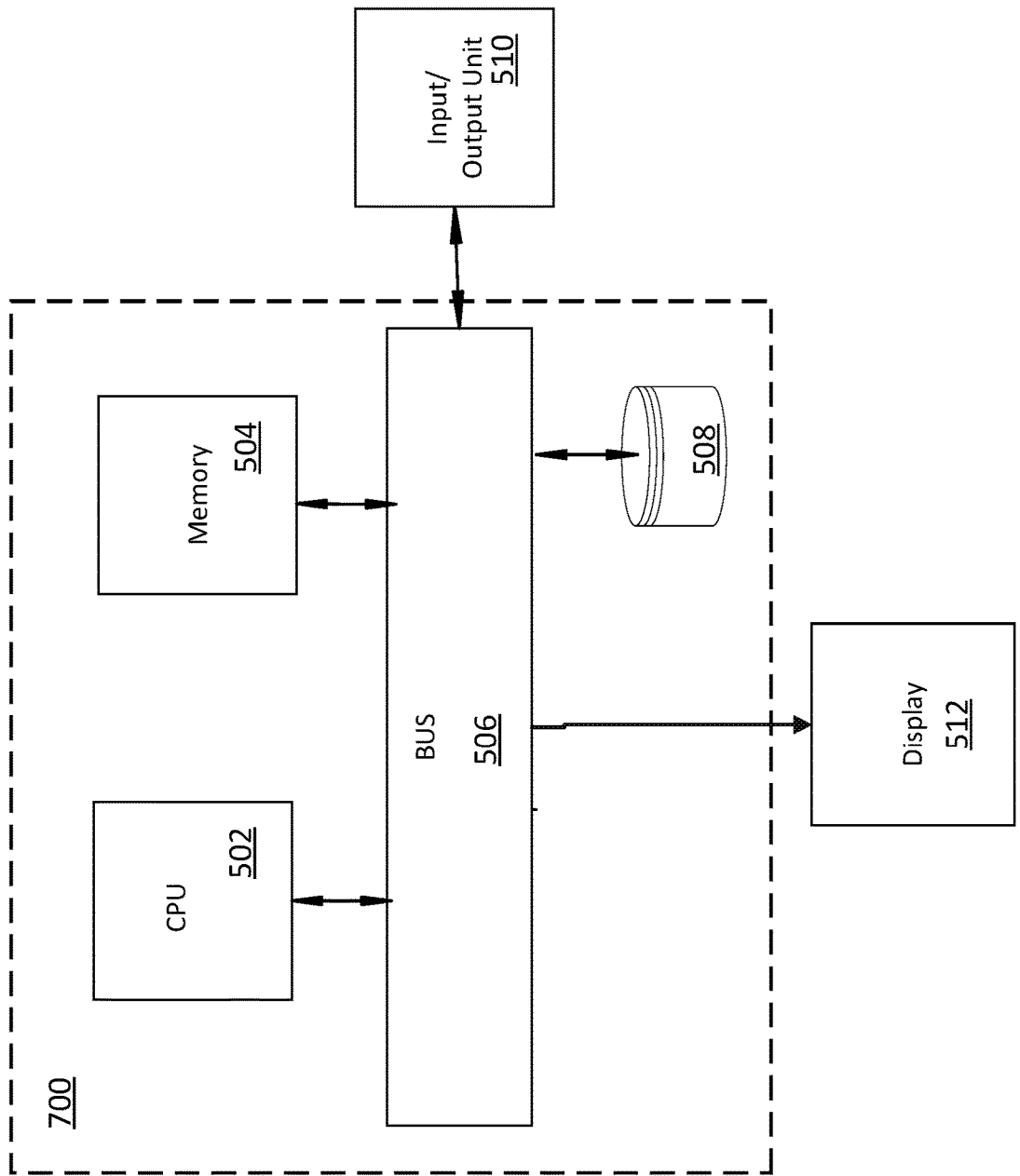
FIG. 5 displays an illustration showing an example of a computing device which may implement the examples described herein.

It should be appreciated that the methods described herein may be performed with a digital processing system, such as a conventional, general-purpose computer system. Special purpose computers, which are designed or programmed to perform particular functions may be used in the alternative. FIG. 5 is an illustration showing an example of the computing device which may implement the examples described herein. The computing device of FIG. 5 may be used to perform examples of the functionality for implementing a Smart NIC/DPU translation agent for data processing and communication between vendor firmware and the Smart NIC/DPU in accordance with some examples. The computing device includes central processing unit (CPU) 502, which is coupled through bus 506 to memory 504, and mass storage device 508. Mass storage device 508 represents a persistent data storage device such as a floppy disc drive or a fixed disc drive, which may be local or remote in some examples. The mass storage device 508 could be a backup storage, in some examples. Memory 504 may include read-only memory, random access memory, etc. Applications resident on the computing device may be stored on or accessed through a computer readable medium such as memory 504 or mass storage device 508 in some examples. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some examples.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4D. The code embodying this functionality may be stored within memory 504 or mass storage device 508 for execution by a processor such as CPU 502 in some examples. The operating system on the computing device may be iOS™, MS-WINDOWS™, OS/2™, UNIX™, LINUX™, or other known operating systems. It should be appreciated that the examples described herein may be integrated with virtualized computing system also.

In the following description, numerous details are set forth. It will be apparent, however, to one skilled in the art, that the examples herein may be practiced without these specific details. In some instances, well-known structures and devices are shown in block diagram form, rather than in detail, in order to avoid obscuring the examples herein.

As used herein, the term agent might describe a given unit of functionality that can be performed in accordance with one or more examples. As used herein, an agent might be implemented utilizing any form of hardware, software, or a combination thereof. For example, one or more processors, controllers, ASICs, PLAS, PALS, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "requesting," "generating," "converting," "transforming," "applying," "deploying," "detecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various examples also relate to an apparatus for performing the operations herein. This apparatus may be specially constructed for the disclosed purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Reference in the description to "one example" or "an example" means that a particular feature, structure, or characteristic described in connection with the example is included in at least one example. The phrase "in one example" located in various places in this description does not necessarily refer to the same example. Like reference numbers signify like elements throughout the description of the figures.

In the above description, numerous details are set forth. It will be apparent, however, to one skilled in the art, that the examples herein may be practiced without these specific details. In some instances, well-known structures and devices are shown in block diagram form, rather than in detail, in order to avoid obscuring the examples herein. It is to be understood that the above description is intended to be illustrative, and not restrictive. Many other examples will be apparent to those of skill in the art upon reading and understanding the above description. Although the examples herein have been described with reference to specific examples, it will be recognized that the examples herein are not limited to those described but can be practiced with modification and alteration within the spirit and scope of the appended claims. Accordingly, the specification and drawings are to be regarded in an illustrative sense rather than a restrictive sense. The scope of the examples herein should, therefore, be determined with reference to the appended claims, along with the full scope of equivalents to which such claims are entitled.

It should be understood that although the terms first, second, etc. may be used herein to describe various steps or calculations, these steps or calculations should not be limited by these terms. These terms are used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular examples and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above examples in mind, it should be understood that the examples might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the examples are useful machine operations. The examples also relate to a device or an apparatus for performing these operations. The apparatus can be specially constructed for the disclosed purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the disclosed operations.

A unit, an application, a layer, an agent or other method-operable entity could be implemented as hardware, firmware, or a processor executing software, or combinations thereof. It should be appreciated that, where a software-based example is disclosed herein, the software can be embodied in a physical machine such as a controller. For example, a controller could include a first agent and a second agent. A controller could be configured to perform various actions, e.g., of a method, an application, a layer or an agent.

The examples can also be embodied as computer readable code on a non-transitory computer readable medium. The computer readable medium is any data storage device that can store data, which can be read thereafter by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Examples described herein may be practiced with various computer system configurations including hand-held devices, tablets, microprocessor systems, microprocessor-based or programmable consumer electronics, minicomputers, mainframe computers and the like. The examples can also be practiced in distributed computing environments where tasks are performed by remote processing devices that are linked through a wire-based or wireless network.

Although the method operations herein are described in a specific order, it should be understood that other operations may be performed in between described operations, described operations may be adjusted so that they occur at slightly different times, or the described operations may be distributed in a system which allows the occurrence of the processing operations at various intervals associated with the processing.

In various examples, one or more portions of the methods and mechanisms described herein may form part of a cloud-computing environment. In such examples, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

The foregoing description, for the purpose of explanation, has been described with reference to specific examples. However, the illustrative discussions above are not intended to be exhaustive or to limit the examples herein to the precise forms disclosed. Many modifications and variations are possible in view of the above teachings. The examples herein are chosen and described in order to best explain the principles of the examples and its practical applications, to thereby enable others skilled in the art to best utilize the examples and various modifications as may be suited to the particular use contemplated. Accordingly, the present examples are to be considered illustrative and not restrictive, and the examples herein are not to be limited to the details given herein but may be modified within the scope and equivalents of the appended claims.

What is claimed is:

1. A method of Life-Cycle Management (LCM) data processing performed by a processor-based LCM system, comprising:
   receiving descriptors in Custom Resources (CRs) format by a universal manager unit of a fabric operator, the descriptors including a function descriptor, a blend descriptor, a layout descriptor, and a settings descriptor, from a client node defining one or more software components;
   applying a software orchestration process to the descriptors using the universal manager unit in cooperation with a workflow engine within the fabric operator; and
   deploying the software components using the workflow engine;
wherein the applying software orchestration process to the descriptors using the universal manager unit comprises:
   detecting whether a new layout/settings pair is designated by the client node;
   verifying, in response to detected new layout/settings pair designation, whether the new layout/settings is correct based upon semantical verification;
   determining, in response to verifying that the new layout/settings are correct, a difference between a set of components and a set of blends associated with a prior layout descriptor and a prior settings descriptor using the universal operations unit;
   generating, based upon the difference, a set of Kubernetes operations to be performed for modifying the software to be deployed; and
   sending the set of Kubernetes operations to a workflow engine to execute as a job request.

2. The method of claim 1, wherein the deploying the software components using the universal operator comprises:
   executing each job request using workflow engine;
   detecting whether the deployment is correct; and
   sending message to the user based upon whether the deployment is correct.

3. The method of claim 1, wherein the determining a difference between a set of components and blends comprises:
   retrieving the prior layout descriptor and the prior settings descriptor using the universal operations unit;
   generating a first in-memory object representation of a first version of the software currently deployed, the first in-memory object representation including content of prior layout and settings descriptors defining the one or more software components;
   generating a second in-memory representation of a second version of the software to be deployed, the second in-memory representation including content of to be deployed layout and settings descriptors defining the one or more software components;
   performing an object-based comparison between the first in-memory object representation and the second in-memory representation; and
   identifying, based on the object-based comparison, at least one layout or settings descriptor change associated with the second version of the software.

4. The method of claim 1, wherein generating the set of Kubernetes operations comprises:
   generating, by the universal operations unit, a set of operations associated with the at least one identified layout or settings descriptor change associated with the second version of the software to be deployed.

5. The method of claim 1, wherein the receiving descriptors by a universal manager unit comprises receiving the descriptors including a function descriptor, a blend descriptor, a layout descriptor, and a settings descriptor, associated with an addition of one or more software components.

6. The method of claim 1, wherein the receiving descriptors by a universal manager unit comprises receiving the descriptors including a function descriptor, a blend descriptor, a layout descriptor, and a settings descriptor, associated with a deletion of one or more software components.

7. A Life-Cycle Management (LCM) system, performed by a processor-based cross-vendor fabric operator, comprising:
   at least one memory having computer-readable instructions stored thereon which, when executed by at least one processor coupled to the at least one memory, cause the at least one processor to:
     receive descriptors in Custom Resources (CRs) format by a universal manager unit of a fabric operator, the descriptors including a function descriptor, a blend descriptor, a layout descriptor, and a settings descriptor, from a client node defining one or more software components;
     apply a software orchestration process to the descriptors using the universal manager unit in cooperation with a workflow engine within the fabric operator; and
     deploy the software components using the workflow engine,
   wherein the processor, to apply software orchestration process to the descriptors using the universal manager unit, is operable to:
     detect whether a new layout/settings pair is designated by the client node;
     verify, in response to detected new layout/settings pair designation, whether the new layout/settings is correct based upon semantical verification;
     determine, in response to verifying that the new layout/settings are correct, a difference between a set of components and a set of blends associated with a prior layout descriptor and a prior settings descriptor using the universal operations unit;
     generate, based upon the difference, a set of Kubernetes operations to be performed for modifying the software to be deployed; and
     send the set of Kubernetes operations to a workflow engine to execute as a job request.

8. The LCM system of claim 7, wherein the processor, to deploy the software components, is operable to:
   execute each job request using workflow engine;
   detect whether the deployment is correct;
   send message to the user based upon whether the deployment is correct.

9. The LCM system of claim 7, wherein the processor, to generate a set of Kubernetes operations, is operable to:
   generate a set of operations associated with the identified changes of the in-memory object representation of the software system using the universal operations unit.

10. The LCM system of claim 7, wherein the processor, to receive descriptors by a universal manager unit, is operable to receive the descriptors including a function descriptor, a blend descriptor, a layout descriptor, and a settings descriptor, associated with an addition of one or more software components.

11. The LCM system of claim 7, wherein the processor, to receive descriptors by a universal manager unit, is operable to receive the descriptors including a function descriptor, a blend descriptor, a layout descriptor, and a settings descriptor, associated with a deletion of one or more software components.

12. A Life-Cycle Management (LCM) system, performed by a processor-based cross-vendor fabric operator, comprising:
   at least one memory having computer-readable instructions stored thereon which, when executed by at least one processor coupled to the at least one memory, cause the at least one processor to:
     receive descriptors in Custom Resources (CRs) format by a universal manager unit of a fabric operator, the descriptors including a function descriptor, a blend descriptor, a layout descriptor, and a settings descriptor, from a client node defining one or more software components;
     apply a software orchestration process to the descriptors using the universal manager unit in cooperation with a workflow engine within the fabric operator; and
     deploy the software components using the workflow engine,
   wherein the processor, for determining a difference between a set of components and blends, is operable to:
     retrieve a prior layout descriptor and a prior settings descriptor using the universal operations unit;
     build a first in-memory object representation of a first version of software system currently deployed using content of the prior layout descriptor and the prior settings descriptor;

build a second in-memory representation of a second version of the software system expected to be deployed using content of a current layout descriptor and a current settings descriptor;

perform an object-based comparison between the first in-memory object representation and the second in-memory representation; and identify, based on the object-based comparison, at least one layout or settings descriptor change associated with the next deployed version of the software.

13. A non-transitory computer-readable medium including code for performing a method of dynamically generating a cross-vendor fabric operator performed by a processor-based Life-Cycle Management (LCM) system, the method comprising:

receiving descriptors in Custom Resources (CRs) format by a universal manager unit of a fabric operator, the descriptors including a function descriptor, a blend descriptor, a layout descriptor, and a settings descriptor, from a client node defining one or more software components;

applying a software orchestration process to the descriptors using the universal manager unit in cooperation with a workflow engine within the fabric operator; and deploying the software components using the workflow engine, wherein the applying software orchestration process to the descriptors using the universal manager unit comprises:

detecting whether a new layout/settings pair is designated by the client node;

verifying, in response to detected new layout/settings pair designation, whether the new layout/settings is correct based upon semantical verification;

determining, in response to verifying that the new layout/settings are correct, a difference between a set of components and blends associated with a prior layout descriptor and a prior settings descriptor using the universal operations unit;

generating, based upon the difference, a set of Kubernetes operations to be performed for modifying the software to be deployed; and sending the set of Kubernetes operations to a workflow engine to execute as a job request.

14. The computer-readable medium of claim 13, wherein the deploying the software components using the universal operator comprises:

executing each job request using workflow engine;

detecting whether the deployment is correct; and sending message to the user based upon whether the deployment is correct.

15. The computer-readable medium of claim 13, wherein the determining a difference between a set of components and blends comprises:

retrieving the prior layout descriptor and the prior settings descriptor using the universal operations unit;

generating a first in-memory object representation of a first version of the software currently deployed, the first in-memory object representation including content of prior layout and settings descriptors defining the one or more software components;

generating a second in-memory representation of a second version of the software to be deployed, the second in-memory representation including content of to be deployed layout and settings descriptors defining the one or more software components;

performing an object-based comparison between the first in-memory object representation and the second in-memory representation; and identifying, based on the object-based comparison, at least one layout or settings descriptor change associated with the second version of the software.

16. The computer-readable medium of claim 13, wherein generating the set of Kubernetes operations comprises:

generating, by the universal operations unit, a set of operations associated with the at least one identified layout or settings descriptor change associated with the to be deployed version of the software.

17. The computer-readable medium of claim 13, wherein the receiving descriptors by a universal manager unit comprises receiving the descriptors including a function descriptor, a blend descriptor, a layout descriptor, and a settings descriptor, associated with an addition of a software component.

* * * * *